(12) United States Patent
Harris et al.

(10) Patent No.: US 10,802,490 B2
(45) Date of Patent: Oct. 13, 2020

(54) ON-THE-FLY AUTONOMOUS VEHICLE REFUELING AND RECHARGING

(71) Applicant: Toyota Motor Engineering & Manufacturing North America, Inc., Erlanger, KY (US)

(72) Inventors: Ryan C. Harris, Saline, MI (US); Matthew A. Jansma, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 528 days.

(21) Appl. No.: 15/293,278

(22) Filed: Oct. 14, 2016

(65) Prior Publication Data

US 2018/0107219 A1    Apr. 19, 2018

(51) Int. Cl.
| | | |
|---|---|---|
| G05D 1/00 | (2006.01) | |
| G05D 1/02 | (2020.01) | |
| G08G 1/00 | (2006.01) | |
| G06Q 30/02 | (2012.01) | |
| B60P 3/22 | (2006.01) | |

(52) U.S. Cl.
CPC ......... *G05D 1/0094* (2013.01); *G05D 1/0212* (2013.01); *G06Q 30/0265* (2013.01); *G06Q 30/0276* (2013.01); *G08G 1/202* (2013.01); *B60P 3/22* (2013.01); *G05D 2201/0213* (2013.01)

(58) Field of Classification Search
CPC ....... B60P 3/22; G05D 1/0088; G05D 1/0094; G05D 1/0276; G05D 2201/0213; G06Q 30/0265; G06Q 30/0276; G08G 1/202
See application file for complete search history.

(56) References Cited

U.S. PATENT DOCUMENTS

| | | | |
|---|---|---|---|
| 6,945,187 B1* | 9/2005 | Woodall | B63B 35/285 114/244 |
| 8,463,534 B2 | 6/2013 | Spinelli et al. | |
| 8,943,992 B1* | 2/2015 | Petersen | B63B 22/023 114/256 |
| 9,763,274 B2* | 9/2017 | Li | H04W 8/005 |
| 9,805,538 B2* | 10/2017 | McQuade | G07F 7/12 |
| 9,873,408 B2* | 1/2018 | Capizzo | B60L 53/60 |
| 9,947,063 B2* | 4/2018 | Miller | G06Q 10/0832 |
| 10,046,962 B2* | 8/2018 | Hall | H04W 4/029 |
| 2011/0043043 A1* | 2/2011 | Anupindi | H01M 10/48 307/66 |
| 2013/0204699 A1* | 8/2013 | MacNeille | H04W 4/021 705/14.53 |

(Continued)

FOREIGN PATENT DOCUMENTS

WO   2007059781 A1   5/2007

*Primary Examiner* — Frederick M Brushaber
(74) *Attorney, Agent, or Firm* — Christopher G. Darrow; Darrow Mustafa PC

(57) ABSTRACT

Described herein are embodiments of an autonomous drone for refueling. The autonomous drone may comprise a fuel storage area; a fuel delivery mechanism coupled to the fuel storage area; a delivery connection coupled to the fuel delivery mechanism; a drive mechanism; and a central controller. The central controller may be configured to receive a refueling location; and control the drive mechanism to pilot the autonomous drone to the refueling location.

12 Claims, 4 Drawing Sheets

(56) References Cited

U.S. PATENT DOCUMENTS

| | | | |
|---|---|---|---|
| 2014/0263629 A1* | 9/2014 | McQuade | G07F 7/12 |
| | | | 235/381 |
| 2015/0289307 A1* | 10/2015 | Li | H04W 8/005 |
| | | | 370/329 |
| 2016/0039541 A1* | 2/2016 | Beardsley | B60L 53/36 |
| | | | 701/2 |
| 2016/0117636 A1* | 4/2016 | Miller | G06Q 10/0832 |
| | | | 705/332 |
| 2017/0205268 A1* | 7/2017 | Misson | G01F 23/0007 |
| 2017/0327091 A1* | 11/2017 | Capizzo | B60L 53/60 |
| 2017/0362076 A1* | 12/2017 | Hall | H04W 4/029 |
| 2018/0107975 A9* | 4/2018 | Miller | G06Q 10/0832 |
| 2018/0339597 A1* | 11/2018 | Kruszelnicki | B60L 53/11 |
| 2018/0339601 A1* | 11/2018 | Kruszelnicki | B60L 53/30 |
| 2019/0299802 A1* | 10/2019 | Neubecker | B60L 53/665 |

* cited by examiner

ON-THE-FLY AUTONOMOUS VEHICLE REFUELING AND RECHARGING

TECHNICAL FIELD

The subject matter described herein relates in general to refueling vehicle and, more particularly, to on-the-fly autonomous vehicle refueling and recharging.

BACKGROUND

Autonomous vehicles require some sort of fuel for their propulsion systems. Some vehicles use fossil fuels, some vehicles use hydrogen, and some vehicles use electricity. Occasionally, the vehicles will need to be refueled when their fuel source has been exhausted. Fossil fuel stations are fairly common. Recharging stations and hydrogen stations are far rarer. For any of the stations, the vehicle must travel to the station in order to refuel.

SUMMARY

This disclosure describes various embodiments for autonomous drone refueling/recharging. In one embodiment, the autonomous drone may comprise a fuel storage area; a fuel delivery mechanism coupled to the fuel storage area; a delivery connection coupled to the fuel delivery mechanism; a drive mechanism; and a central controller. The central controller may be configured to receive a refueling location; and control the drive mechanism to pilot the autonomous drone to the refueling location.

In another embodiment a system for autonomous refueling is described. The system may comprise a dispatcher and am autonomous drone. The dispatcher may comprise a memory and a processor coupled to the memory. The processor may be configured to receive a fuel request from a vehicle; determine a refueling location based, at least in part, on the refueling request; determine an autonomous drone to dispatch based, at least in part on the refueling location and a type of fuel requested by the vehicle; and transmit a message to the autonomous drone, the message comprising at least the refueling location. The autonomous drone may comprise a fuel storage area; a fuel delivery mechanism coupled to the fuel storage area; a delivery connection coupled to the fuel delivery mechanism; a drive mechanism; and a central controller. The central controller may be configured to receive the message; and control the drive mechanism to pilot the autonomous drone to the refueling location.

In another embodiment, a method for autonomous refueling is described. The method may comprise receiving, at a dispatcher, a fuel request from a vehicle; determining, at the dispatcher, a refueling location based, at least in part, on the refueling request; determining, at the dispatcher, an autonomous drone to dispatch based, at least in part on the refueling location and a type of fuel requested by the vehicle; transmitting, at the dispatcher, a message to the autonomous drone, the message comprising at least the refueling location; receiving, at the autonomous drone, the message; and controlling a drive mechanism of the autonomous drone to pilot the autonomous drone to the refueling location.

DETAILED DESCRIPTION

Described herein is a system and method for on-the-fly autonomous vehicle refueling and recharging. The system includes an autonomous refueling drone. Refueling and recharging may be used interchangeably herein. As used herein, fuel may refer to any substance used for propulsion of a vehicle, including but not limited to fossil fuels and other liquid fuels, hydrogen and other gaseous fuels, and electricity. The drone may have a fuel storage area to carry fuel to vehicles needing refueling. The drone may have a propulsion system that uses fuel from the fuel storage area or a separate fuel tank. The drone may be autonomously controlled or remotely controlled. The drone may communicate wirelessly with a dispatcher or the drone may comprise a dispatcher.

The dispatcher may be configured to receive fuel requests from vehicles needing refueling. There may be more than one dispatcher, e.g. each fuel supplier may have its own dispatcher and all the dispatchers may receive the fuel request. In another embodiment a central dispatcher may distribute requests to each fuel supplier and each fuel supplier may reply to the fuel request with fuel prices. In either case the fuel requester may receive one or more responses indicating the fuel price offered by a supplier. The fuel requester may accept one of the offers for fuel and the corresponding dispatcher may dispatch a drone.

The dispatcher may have determined the drone to dispatch prior to making the offer, or after the offer is made. The dispatcher may determine the drone to dispatch based on one or more conditions. The conditions may include, but are not limited to the characteristics of the drone, the characteristics of the vehicle requesting fuel, the type of fuel requested, and the distance between the drone and the anticipated refueling location.

When the drone reaches the vehicle to be refueled, the drone may use onboard sensors alone or in combination with sensor data from the vehicle to be refueled in order to couple with the vehicle. The sensors may include various proximity sensors, global positioning satellite (GPS) sensors, or other types of positioning sensors. Once coupled with the vehicle, the drone may refuel the vehicle.

After the drone has refueled the vehicle, the drone may return to a refilling station. If the drone still has fuel, the drone and/or the dispatcher may send an advertisement to vehicles in the area. The advertisement may advertise the amount of fuel available and/or the cost of the fuel. The drone may gain efficiencies in fuel economy by unloading as much fuel as possible by selling to additional vehicles, rather than carrying the fuel back to a refilling station. In an embodiment, the drone may be filled at the refilling station in response to the fuel request, and only the amount of fuel requested may be added to the drone.

Figure 1:
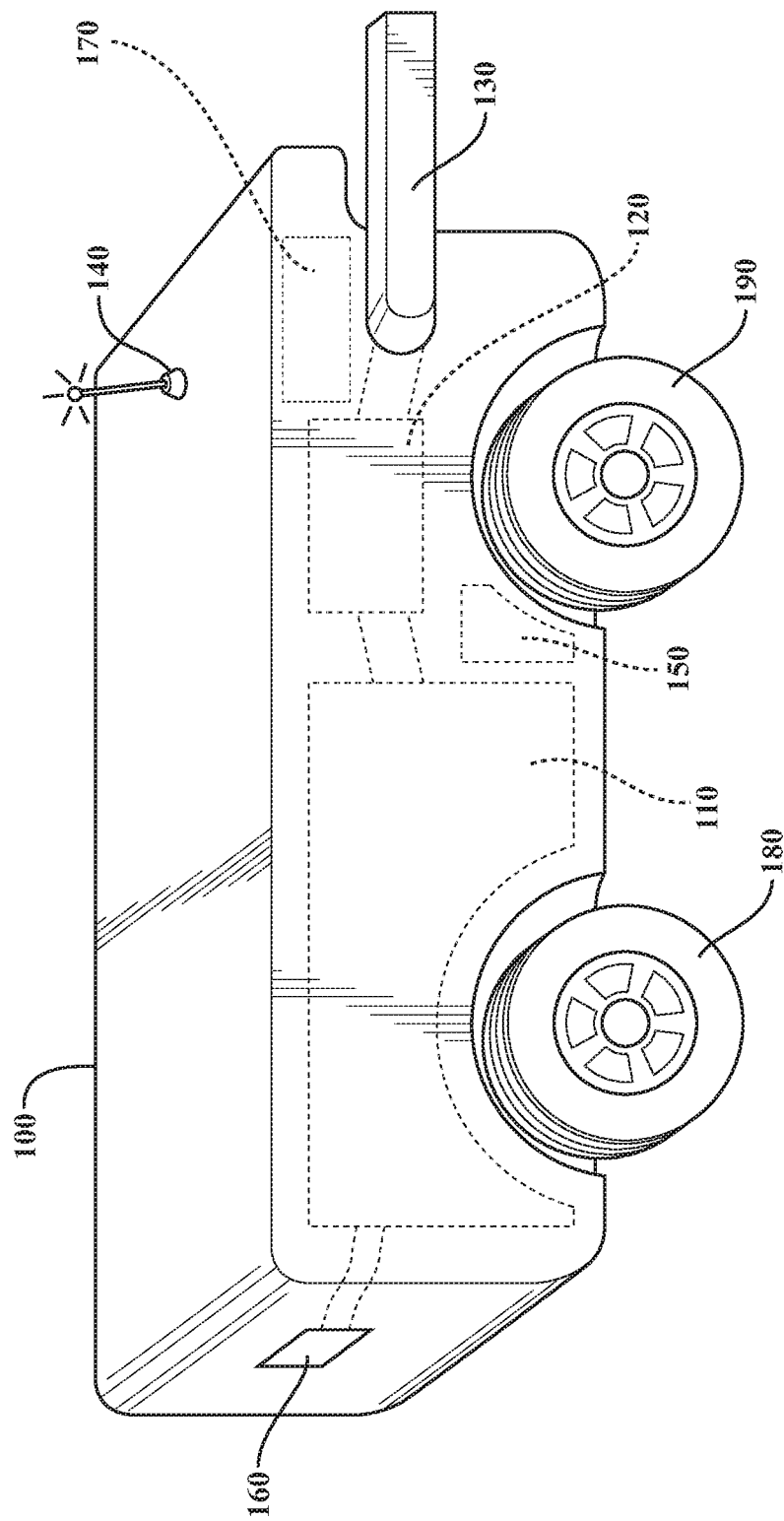
FIG. 1 is a diagram of an embodiment of a refueling drone.

FIG. 1 is a diagram of an embodiment of an autonomous refueling/recharging drone 100. The drone 100 may comprise the fuel storage area 110. Fuel storage area 110 may comprise batteries for providing a charge to an electric vehicle. Fuel storage area 110 may comprise a reservoir for liquid fuel storage. Fuel storage area 110 may comprise one or more cylinders for storing compressed gas. In an embodiment, fuel storage area 110 may comprise more than one type of fuel storage. For example, fuel storage area 110 may comprise batteries and a liquid fuel reservoir. Fuel storage area 110 may comprise any number of any type of fuel storage for fuels a vehicle may use.

Drone 100 may comprise a delivery mechanism 120. Delivery mechanism 120 may be coupled to fuel storage area 110. Delivery mechanism 120 may be a mechanism for delivering fuel from fuel storage area 110. Delivery mechanism 120 may comprise mechanisms for more than one type of fuel. For example, delivery mechanism 120 may be a fuel pump, a gas pressure regulator, a voltage regulator, or any combination of the preceding. Delivery mechanism 120 may be coupled to delivery connection 130. Delivery connection 130 may comprise a connector that connects to the vehicle that is being refueled or recharged. For example, the connector may be a plug for an electric vehicle, a pressure coupler for a hydrogen gas vehicle, or a spout for a gasoline vehicle. Delivery connection 130 may comprise more than one type of connector based on the type of fuel or fuels in fuel storage area 110. Delivery mechanism 120 and delivery connection 130 may be controlled by central controller 170. Central controller 170 may contain software and/or hardware configured for controlling the components of drone 100.

Drone 100 may comprise an antenna 140 for wireless communication with a dispatcher or with a vehicle that is being refueled or recharged. Antenna 140 may also be used for other communication purposes, e.g., advertising to other vehicles. Antenna 140 may communicate using one or more wireless communication technologies. Antenna 140 may comprise a single antenna or an array of antennae depending upon the communication protocol used by drone 100. Antenna 140 may communicate using more than one wireless technology at any given time. In some embodiments, drone 100 may communicate using other means not pictured, e.g., a wired connection. The wired connection may be coupled for communication when the drone 100 connects to a vehicle or a refilling station or any other wired connection. Communications received at or sent by antenna 140 may be generated or processed by central controller 170. Central controller 170 may provide information about drone 100 to a dispatcher via antenna 140. Central controller 170 may receive commands from a dispatcher and control the drone 100 based upon the received commands.

Drone 100 may comprise a drive mechanism 150. Drive mechanism 150 may be an electric motor, a gas motor, or some other propulsion mechanism. Drive mechanism 150 may be controlled autonomously by central controller 170. Control signals for drive mechanism 150 may be received via antenna 140 and processed by central controller 170. Feedback, e.g., operating characteristics, from drive mechanism 150 and drone 100 may be determined by central controller 170 and transmitted via antenna 140. The central controller 170 may receive a destination for refueling and may calculate a route to the destination. In an embodiment, the route to refueling may be provided to the central controller 170 by a dispatcher. In either case, the central controller 170 may control drive mechanism 150 to pilot the drone 100 to the destination. Actions described as taken by drone 100 or its components may be controlled or implemented by central controller 170.

Drone 100 may comprise two axles (not pictured), the axles may be coupled wheels 180 and 190 respectively. In other embodiments, drone 100 may have any number of wheels and axles. Drive mechanism 150 may be coupled directly or indirectly to one or more axles in order to propel the vehicle.

Drone 100 may comprise a refill port 160. Refill port 160 may be coupled to fuel storage area 110. Refill port 160 may be used when refilling fuel storage area 110. For example, refill port 160 may comprise an electrical connector, a liquid fuel receptacle, a gas coupling, or any combination of the preceding. Refill port 160 may be selected based on the type or types of fuel stored in fuel storage area 110. Refill port 160 may comprise a cover or other mechanism to keep debris and other matter out of any couplings or connectors within refill port 160.

Figure 2:
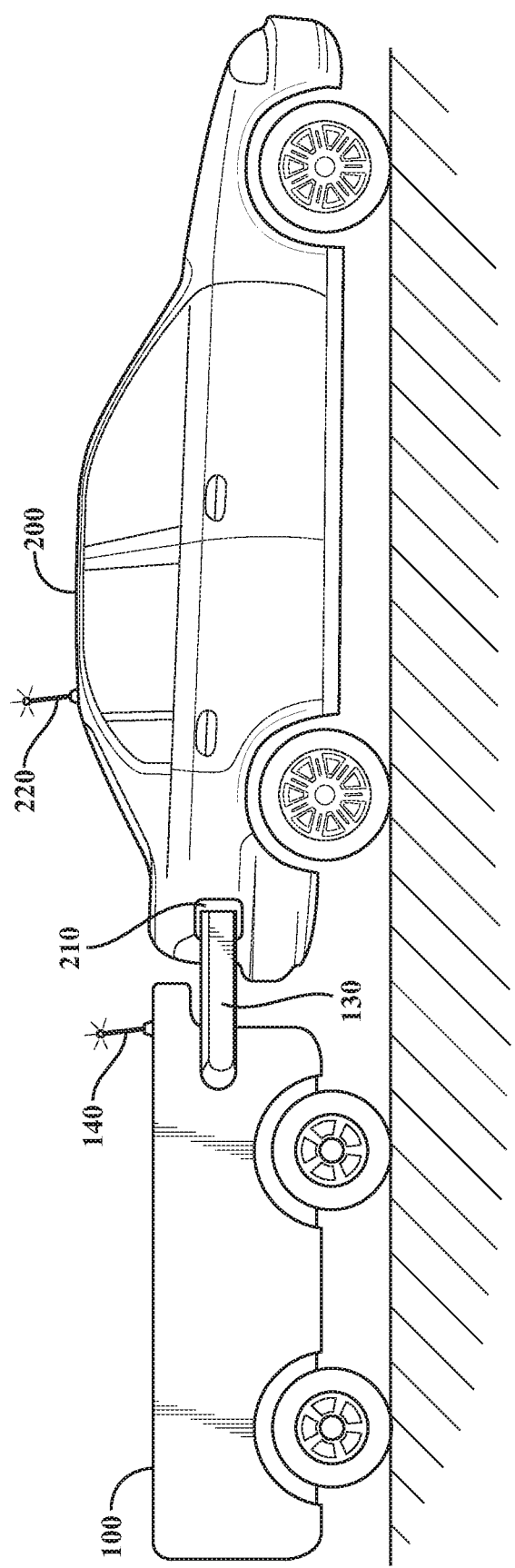
FIG. 2 is a diagram of an embodiment of a refueling drone refueling a vehicle.

FIG. 2 is a diagram of an embodiment of a drone coupled to a vehicle. Drone 100 may be coupled to vehicle 200 via delivery connection 130. Delivery connection 130 may connect to port 210. Port 210 may be a charging port, fueling port, or some other type of port used for refueling vehicle 200 based on the type of propulsion system of vehicle 200. Vehicle 200 may communicate with drone 100 using antenna 220. Drone 100 may communicate with vehicle 200 using antenna 140. Drone 100 and vehicle 200 may communicate their relative positions determined using GPS or other location detection services. Drone 100 and vehicle 200 may have other sensors for determining proximity, for example ultrasonic or radar sensors. The proximity sensors may be used alone or in conjunction with the location devices to enable the drone 100 to couple with vehicle 200. Additional communication may occur via wired and/or wireless communication initiated when delivery connection 130 couples to vehicle 200. For example, near field communication (NFC), electrical contacts, or some other communication protocol. The additional communication may include fuel or charge level or other information relevant to the refueling/recharging of vehicle 200. The additional communication may be used to indicate completion of the refueling/recharging process.

Figure 3:
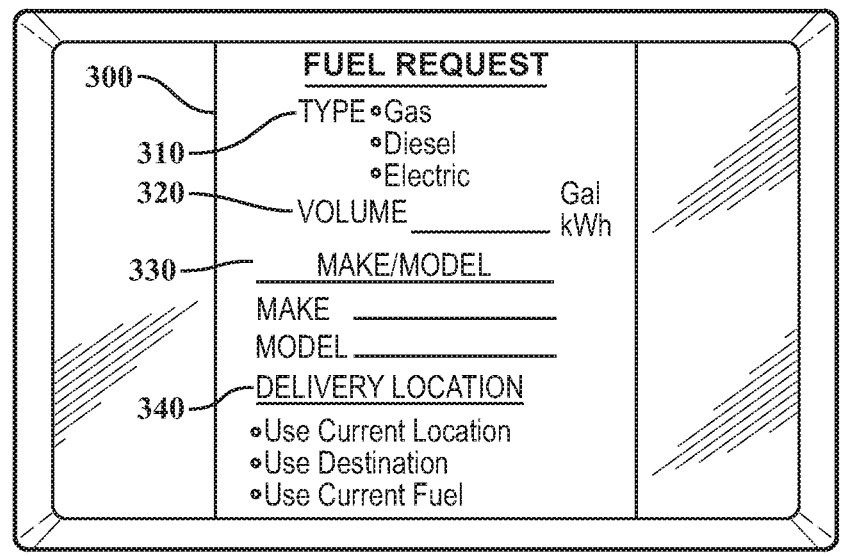
FIG. 3 is a diagram of an embodiment of a fuel request.

FIG. 3 is a diagram of an embodiment of a fuel request 300. The fuel request 300 may be displayed on a display in a vehicle or on a mobile device or some other display. In an embodiment, the information provided in fuel request 300 may be given orally over a telephone or other communication device or may be inputted using some other input/output (I/O) device, e.g. a keyboard. The fuel request may include the type 310 of fuel requested. The type 310 may be entered by a user, may be automatically determined based on the vehicle type, and/or may be determined based on previous refueling. Volume 320 may be an amount of fuel requested by the user. The volume 320 may be manually entered by the user, or automatically determined by vehicle 200. The volume 320 may be indicated as a fill-up or some volume less than a fill-up. For example, a user may be in an area where fuel is highly priced relative to another area. The user may determine to only purchase a few gallons of fuel to allow the vehicle 200 to have enough fuel to reach the lower priced area. The volume may be gallons, kilowatt-hours (kWh), or some other measure of the fuel required by vehicle 200.

Fuel request 300 may also include the make and model information 330 of vehicle 200. Drones may be stored at a refill station, for example a service station or some other fuel depot. Wherever the drones are stored there may be an interface to a dispatcher. In an embodiment, the drone may comprise the dispatcher or a client side portion of the dispatcher. The dispatcher may be hosted locally at the drone refill station or remotely at a central location. A dispatcher at a central location may supply one or more refill stations or other areas where drones may be stored with fuel requests. The dispatcher may use the make and model information 330 to determine an appropriate drone for dispatching to vehicle 200. An appropriate drone may be determined based upon the type of fuel the drone is carrying, the amount of fuel the drone is carrying, the size of the drone, and/or other factors. For example, a make and model with a tall body or unique fuel type may require a special drone to be dispatched.

Fuel request 300 may include a delivery location 340. The delivery location 340 may specify the current location of the vehicle, the destination of the vehicle, and/or the current fuel level of the vehicle. The dispatcher may determine when and/or where to dispatch drone 100 from based upon the delivery location 340. The dispatcher may determine where to dispatch the drone to based upon the delivery location 340.

In an embodiment, the dispatcher may receive a delivery location 340 indicating the current location of the vehicle. If the vehicle is not moving, the dispatcher may determine a drone to dispatch to the vehicle based on the current location of the vehicle. The dispatcher may select the drone that is closest to the current location that has fuel appropriate for the vehicle transmitting the fuel request 300.

In an embodiment, the dispatcher may receive a delivery location 340 indicating the destination of the vehicle transmitting the fuel request 300. A user may enter the destination into the fuel request 300, a navigation system may enter the destination into the fuel request 300, or some other device may enter the destination into the fuel request 300. The dispatcher may receive the current location and travel characteristics of the vehicle and dispatch a drone based on the received information and the destination. The travel characteristics may include speed, direction, current fuel level, or other telematics of the vehicle. The travel characteristics may also include a route of the vehicle from the current location to a destination. The route may be provided by a navigation system, or may be determined by the dispatcher in the case where only the destination location is provided in the fuel request. The dispatcher may choose a drone along the route to dispatch to the vehicle.

In an embodiment, the dispatcher may receive a current fuel volume 320 indicating the amount of fuel presently in the vehicle transmitting the fuel request 300. The amount of fuel may include volume of liquid fuel, pounds of gaseous fuel, kWh of charge remaining, or some other measure of whatever substance may be used to propel the vehicle transmitting the fuel request 300. In an embodiment, the current volume 320 may include a distance until all fuel in the vehicle is exhausted. The distance may be calculated by the vehicle, a dispatcher, or some other device. The distance until all fuel is exhausted may be calculated based on the current volume of fuel and a fuel usage rate of the vehicle. The dispatcher may use this information to determine where to dispatch a drone from. For example, a determination may be made that the vehicle will run out of fuel in less than 10 miles. The dispatcher may find a drone within a 10-mile radius. An additional consideration may include the travel time for the drone to reach the vehicle. For example, if the vehicle is going to run out of fuel in 15 minutes at its current fuel usage, the dispatcher may dispatch a drone that can reach the vehicle in less than 15 minutes.

In other embodiments of fuel request 300, more or less information fields may be present. For example, the fuel request may only include a type of fuel and an amount. Further, even though fields may be present, all field may not be required to be completed prior to transmitting a fuel request.

Figure 4:
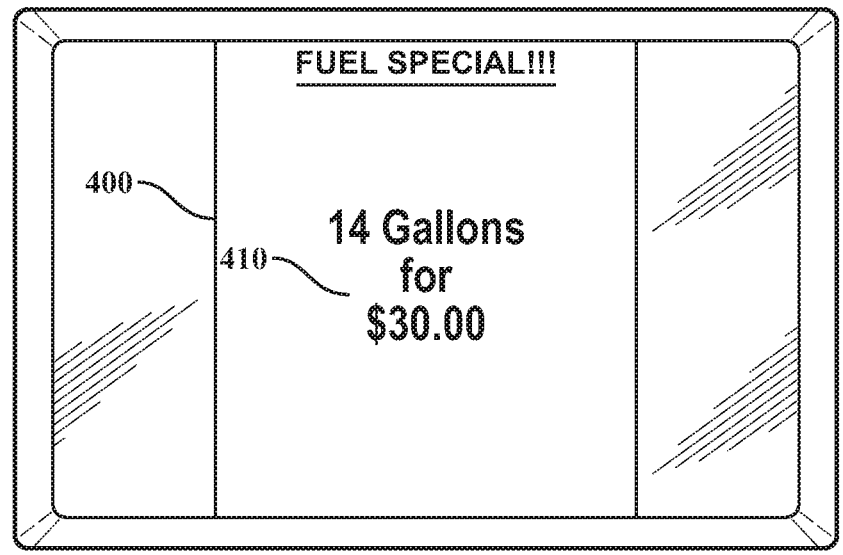
FIG. 4 is a diagram of an embodiment of a fuel advertisement.

FIG. 4 is a diagram of an embodiment of a fuel advertisement 400. The fuel advertisement 400 may be displayed on a display of a vehicle, on a mobile device, or some other display. The fuel advertisement 400 may display a quantity and price 410 for fuel available from a nearby drone. The nearby drone may be stationary, e.g., at a refill station, or mobile, e.g. en route from a refueling. In an embodiment, a drone may have previously delivered fuel to a different vehicle and have some fuel remaining in its fuel storage area. Rather than transport the remaining fuel back to a station, the drone may advertise to nearby vehicles that there is fuel available for purchase. The drone and/or a dispatcher may create the advertisement. The drone and/or a dispatcher may send the advertisement. In an embodiment, the advertised price may be at a discounted rate in order to incentivize a potential buyer. Selling the fuel rather than carrying it back to a station may be more efficient and may result in decreased operating expenses for the drone operator.

Figure 5:
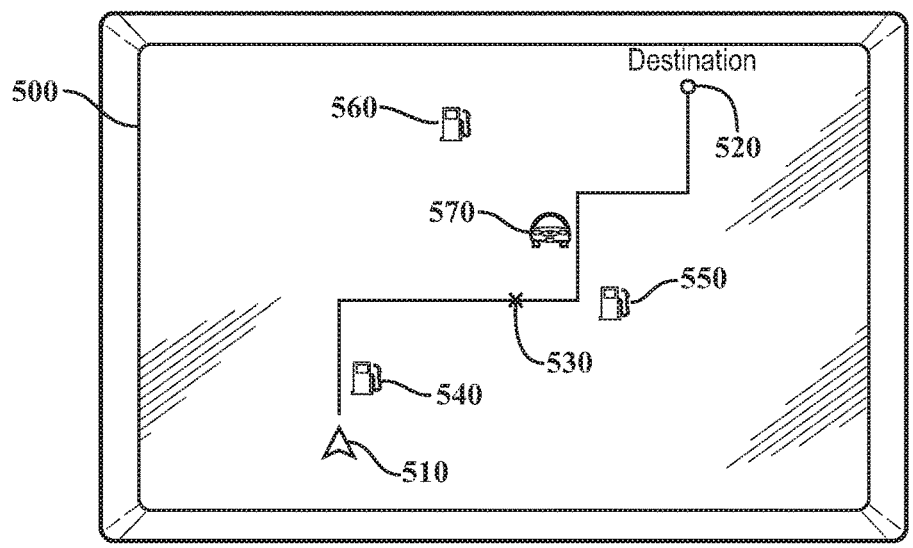
FIG. 5 is a diagram of an embodiment of a refueling scenario.

FIG. 5 is a diagram of an embodiment of a refueling scenario. A vehicle, e.g. vehicle 200, may be represented by indicator 510. The vehicle represented by indicator 510 may have a final destination at position 520. In an embodiment, a determination may be made that the vehicle will exhaust its fuel supply at location 530 along a predetermined route. The determination may be made based on the remaining amount of fuel in the vehicle and characteristics of how the vehicle is traveling, e.g., speed, traffic patterns, and other factors that may influence the rate at which the fuel is used. In this example, the fuel may be any type of fuel used for propulsion of a vehicle, e.g., gasoline, hydrogen, or electricity. The determination may be made by the vehicle, a drone dispatcher, vehicle operator, or some other system capable of receiving data related to fuel exhaustion.

The vehicle represented by indicator 510 may submit a fuel request, e.g., fuel request 300. The fuel request may be received by a dispatcher. The dispatcher may be at a centralized location in communication with one or more drones. In an embodiment, multiple dispatchers may be present, e.g., a dispatcher for each of one or more fuel suppliers. If there are multiple dispatchers, the fuel request may be sent to each of the dispatchers. Upon receiving the fuel request, the dispatcher may determine when the vehicle will exhaust its fuel supply. In an embodiment, the vehicle may determine when and where it will exhaust its fuel supply and transmit this information to the dispatcher. The dispatcher may transmit a message to the vehicle indicating the price of the fuel. The vehicle operator may accept the price and/or specify a quantity of fuel desired. Upon acceptance of the fuel price, the dispatcher may determine which of one or more drones to dispatch to refuel the vehicle. In an embodiment, the drone may be determined prior to acceptance of the price. In an embodiment, the price may be determined based upon the distance the drone needs to travel, current fuel prices in the area, and/or other factors affecting fuel costs. The dispatcher may determine the drone to dispatch based on a number of factors. For example, the type of fuel requested, the amount of fuel requested, the distance from the drone to the vehicle, and/or the location at which the vehicle may exhaust its fuel supply. The foregoing list is not meant to be an exhaustive list of factors and other factors may be considered.

Drones may be located at stations 540, 550, and 560. The dispatcher may determine the capabilities of drones located at stations 540, 550, and 560. The dispatcher may determine which of the drones to dispatch based upon the determined capabilities of the drones, other information related to the vehicle, and/or the fuel request. For example, the dispatcher may determine that stations 550 and 560 have drones with the fuel type and quantity that the vehicle has requested. The dispatcher may then determine which of station 550 and 560 to dispatch the compatible drone from. The dispatcher may determine that the drone at station 560 is too far from the route of the vehicle and may instead dispatch the drone from station 550. Other factors may be considered, for example, amount of fuel for the drone's propulsion system, travel times to a refueling location, e.g. location 530, other characteristics of the drone and/or vehicle needing refueling, and/or travel routes.

After the drone dispatched to refuel the vehicle represented by indicator 510 refuels the vehicle, the drone may have remaining fuel onboard. The drone may broadcast a message to nearby vehicles, e.g. vehicle 570, including an advertisement, e.g., advertisement 400. The advertisement may solicit purchasers for the remaining fuel in the drone. In an embodiment, the dispatcher or some other device may transmit the advertisement to vehicles in the vicinity of the drone.

Figure 6:
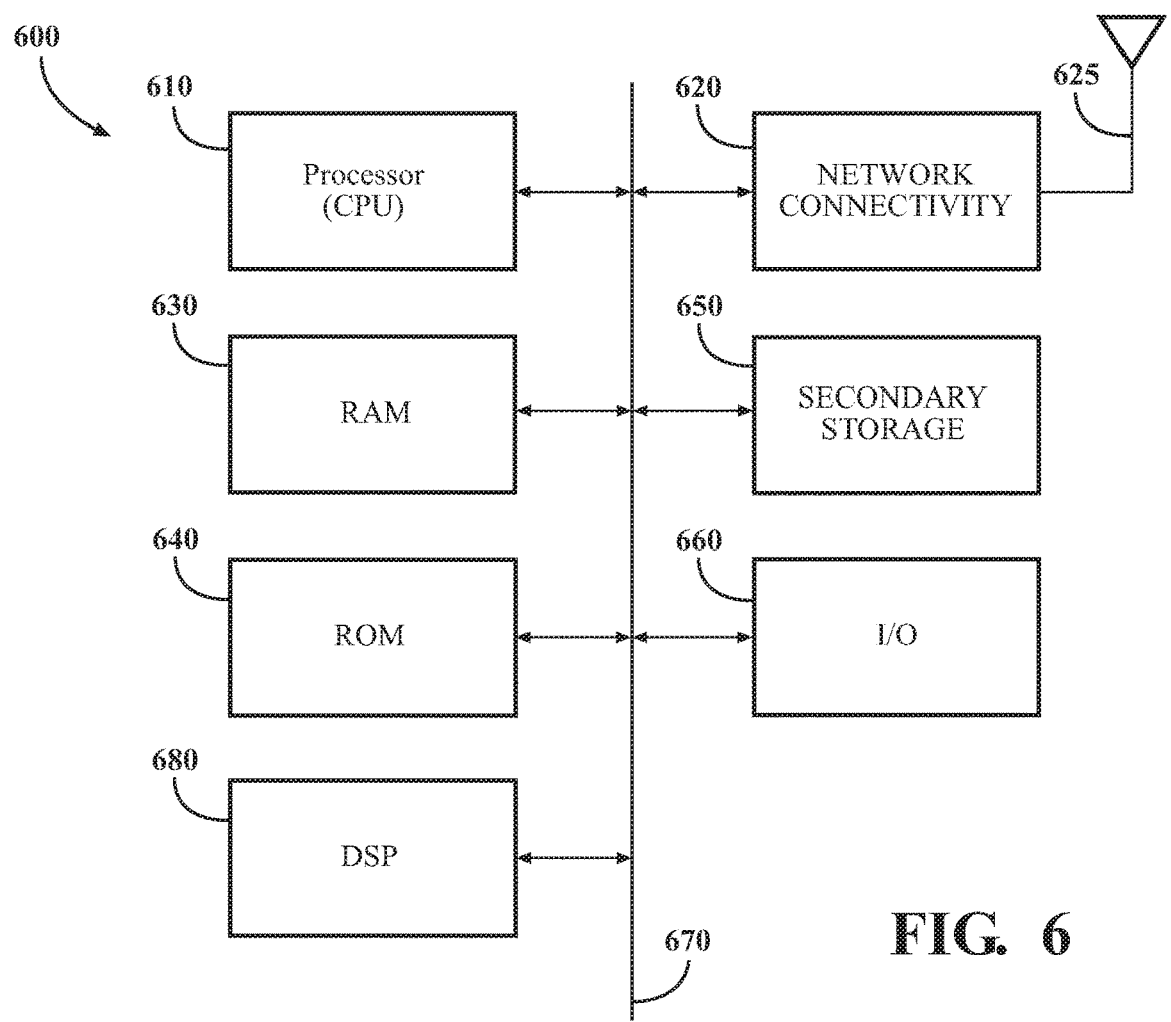
FIG. 6 is a diagram of an embodiment of a system in which embodiments described herein may be implemented.

FIG. 6 illustrates an example of a system 600 that includes a processor 610 suitable for implementing one or more embodiments disclosed herein, e.g., a dispatcher or central controller 170. The processor 610 may control the overall operation of the device.

In addition to the processor 610 (which may be referred to as a central processor unit or CPU), the system 600 might include network connectivity devices 620, random access memory (RAM) 630, read only memory (ROM) 640, secondary storage 650, and input/output (I/O) devices 660. These components might communicate with one another via a bus 670. In some cases, some of these components may not be present or may be combined in various combinations with one another or with other components not shown. These components might be located in a single physical entity or in more than one physical entity. Any actions described herein as being taken by the processor 610 might be taken by the processor 610 alone or by the processor 610 in conjunction with one or more components shown or not shown in the drawing, such as a digital signal processor (DSP) 680. Although the DSP 680 is shown as a separate component, the DSP 680 might be incorporated into the processor 610.

The processor 610 executes instructions, codes, computer programs, or scripts that it might access from the network connectivity devices 620, RAM 630, ROM 640, or secondary storage 650 (which might include various disk-based systems such as hard disk, floppy disk, or optical disk). While only one CPU 610 is shown, multiple processors may be present. Thus, while instructions may be discussed as being executed by a processor, the instructions may be executed simultaneously, serially, or otherwise by one or multiple processors. The processor 610 may be implemented as one or more CPU chips and may be a hardware device capable of executing computer instructions.

The network connectivity devices 620 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 620 may enable the processor 610 to communicate with the Internet or one or more telecommunications networks or other networks from which the processor 610 might receive information or to which the processor 610 might output information. The network connectivity devices 620 might also include one or more transceiver components 625 capable of transmitting and/or receiving data wirelessly.

The RAM 630 might be used to store volatile data and perhaps to store instructions that are executed by the processor 610. The ROM 640 is a non-volatile memory device that typically has a smaller memory capacity than the memory capacity of the secondary storage 650. ROM 640 might be used to store instructions and perhaps data that are read during execution of the instructions. Access to both RAM 630 and ROM 640 is typically faster than to secondary storage 650. The secondary storage 650 is typically comprised of one or more disk drives or tape drives and might be used for non-volatile storage of data or as an over-flow data storage device if RAM 630 is not large enough to hold all working data. Secondary storage 650 may be used to store programs that are loaded into RAM 630 when such programs are selected for execution.

The I/O devices 660 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 625 might be considered to be a component of the I/O devices 660 instead of or in addition to being a component of the network connectivity devices 620.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium.

What is claimed is:

1. A system for autonomous refueling comprising:
   a dispatcher comprising:
      a memory; and
      a processor coupled to the memory, the processor configured to:
         receive a refueling request from a vehicle, the refueling request including make and model information of the vehicle;
         determine a delivery location based, at least in part, on the refueling request;
         select an autonomous drone from among a plurality of autonomous drones having different sizes to dispatch based, at least in part, on a size of the autonomous drone and the make and model information of the vehicle;
         transmit a message to the autonomous drone, the message comprising at least the delivery location; and
   the autonomous drone comprising:
      a fuel storage area;
      a fuel delivery mechanism coupled to the fuel storage area;
      a delivery connection coupled to the fuel delivery mechanism;
      a drive mechanism; and
      a central controller configured to:
         receive the message; and
         control the drive mechanism to pilot the autonomous drone to the delivery location.

2. The system of claim 1, wherein the processor is further configured to determine a requested volume of fuel based, at least in part, on the refueling request.

3. The system of claim 2, wherein the processor is further configured to:
   determine a current volume of fuel in the vehicle based, at least in part, on the refueling request;
   determine a size of a fuel tank of the vehicle based, at least in part, on the refueling request; and
   determine the requested volume of fuel based further on the current volume of fuel in the vehicle and the size of the fuel tank of the vehicle.

4. The system of claim 1, wherein the processor is further configured to:
   determine a route of the vehicle based on one of:
      a predetermined route included with the refueling request; or
      a destination included with the refueling request.

5. The system of claim 4, wherein the delivery location is along the route.

6. The system of claim 4, wherein the delivery location is an estimated location at which the vehicle may exhaust its fuel supply.

7. The system of claim 1, wherein the central controller is further configured to:
   control the delivery connection to connect to the vehicle upon arriving at the delivery location; and
   control the fuel delivery mechanism to provide fuel to the vehicle.

8. The system of claim 7, wherein the processor is further configured to:
   determine an amount of fuel remaining in the fuel storage area after refilling the vehicle;
   create an electronic advertisement based, at least in part, on the amount of fuel remaining; and
   broadcast the electronic advertisement to other vehicles.

9. The system of claim 7, wherein the autonomous drone includes an antenna, and the central controller is further configured to:
   determine an amount of fuel remaining in the fuel storage area after refilling the vehicle;
   create an electronic advertisement based, at least in part, on the amount of fuel remaining; and
   broadcast the electronic advertisement to other vehicles via the antenna.

10. A method for autonomous refueling, the method comprising:
    receiving, at a dispatcher, a fuel request from a vehicle, the refueling request including make and model information of the vehicle;
    determining, at the dispatcher, a refueling location based, at least in part, on the refueling request;
    selecting, by the dispatcher, an autonomous drone from among a plurality of autonomous drones having different sizes to dispatch based, at least in part, on a size of the autonomous drone and the make and model information of the vehicle;
    transmitting, at the dispatcher, a message to the autonomous drone, the message comprising at least the refueling location;
    receiving, at the autonomous drone, the message; and
    controlling a drive mechanism of the autonomous drone to pilot the autonomous drone to the refueling location.

11. The method of claim 10, further comprising:
    connecting a delivery connection of the autonomous drone to the vehicle upon arriving at the refueling location; and
    providing fuel via the delivery connection to the vehicle.

12. The method of claim 11, further comprising:
   determining an amount of fuel remaining in a fuel storage area of the autonomous drone after refilling the vehicle;
   creating an electronic advertisement based, at least in part, on the amount of fuel remaining;
   transmitting the electronic advertisement to other vehicles.

\* \* \* \* \*